UNITED STATES PATENT OFFICE.

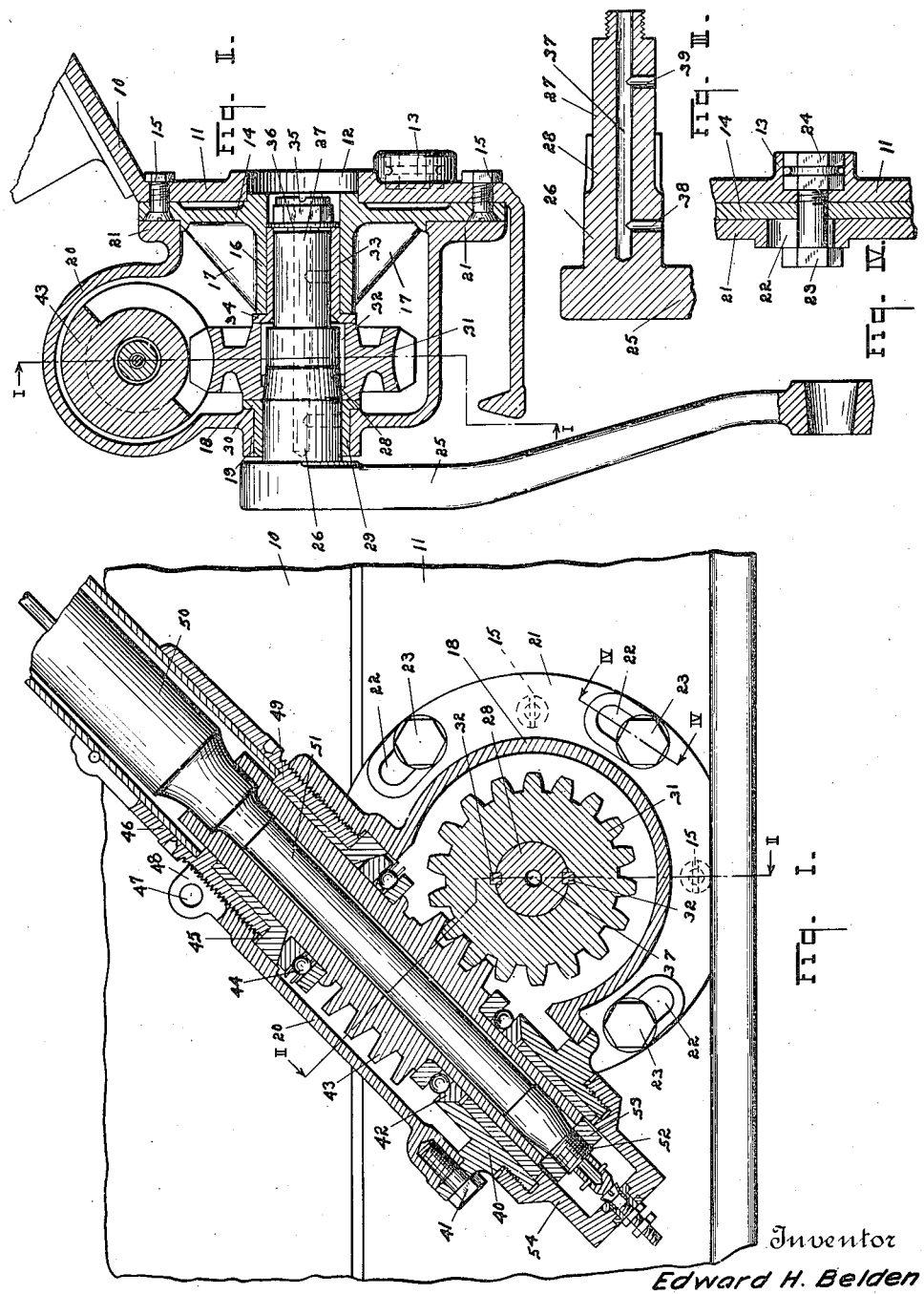

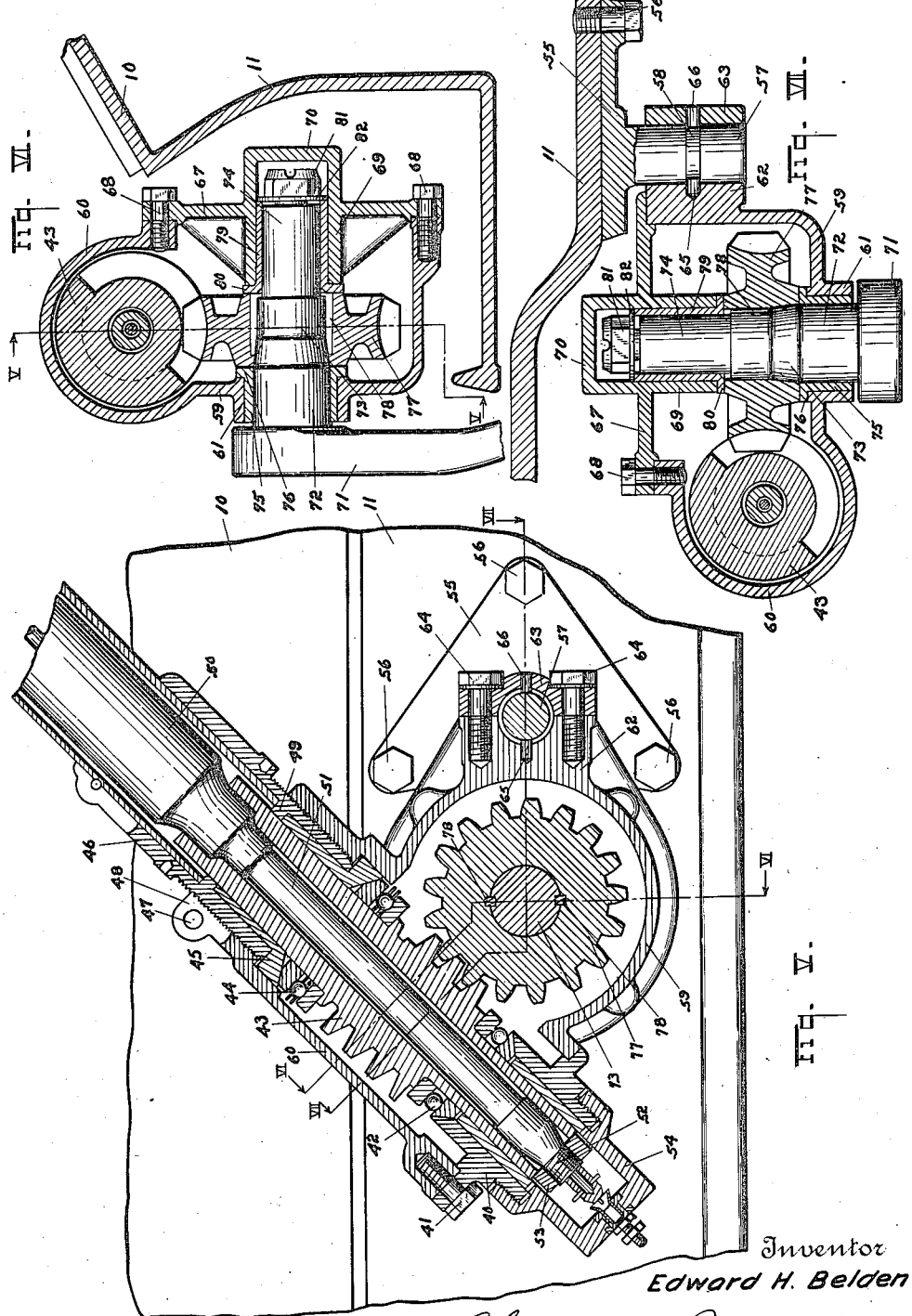

EDWARD H. BELDEN, OF TOLEDO, OHIO, ASSIGNOR TO INDUSTRIAL RESEARCH CORPORATION, OF TOLEDO, OHIO, A CORPORATION OF DELAWARE.

STEERING MECHANISM.

1,323,815.         Specification of Letters Patent.         Patented Dec. 2, 1919.

Application filed March 6, 1918. Serial No. 220,757.

*To all whom it may concern:*

Be it known that I, EDWARD H. BELDEN, a citizen of the United States, residing at Toledo, in the county of Lucas and State of Ohio, have invented certain new and useful Improvements in Steering Mechanism, of which I declare the following to be a full, clear, and exact description.

This invention relates to improvements in the steering mechanism of motor vehicles.

The principal object of this invention is to provide an improved, compact and simple housing for the gearing connecting the steering post and the steering arm.

A further object of this invention is to provide a casing mounted upon the engine crank case and inclosing the gearing connecting the steering post and the steering arm, said casing being so mounted that the steering post may be inserted in place and the casing afterward adjusted so as to give the proper angle to the casing dependent upon the inclination of the steering post.

A further object of my invention is to provide an improved arrangement of the gearing connecting the steering post and the steering arm, of such a nature as to facilitate the lubrication of the steering arm spindle.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which:

Figure I is a sectional, elevational view of steering mechanism embodying my invention, taken substantially on the line I—I of Fig. II.

Fig. II is a detail, sectional view, taken substantially on the line II—II of Fig. I.

Fig. III is a fragmentary, detail, sectional view corresponding to a part of Fig. II, the steering spindle being shown in longitudinal section.

Fig. IV is a fragmentary, detail, sectional view, taken substantially on the line IV—IV of Fig. I.

Fig. V is a view of a modified construction taken substantially on the line V—V of Fig. VI.

Fig. VI is a detail, sectional view, taken substantially on the line VI—VI of Fig. V, and Fig. VII is a detail, sectional view, taken substantially on the line VII—VII of Fig. V.

In the drawing, similar reference numerals refer to similar parts throughout the several views, and the sectional views are taken looking in the direction of the little arrows at the ends of the section lines.

Considering the numbered parts of the drawing, I have shown the engine crank case 10 provided with a vertical wall 11 in which there is the opening 12, as shown in Fig. II of the drawing. A plurality of bosses 13 are also provided, arranged on the inner side of wall 11 at equal distances from the center of the opening 12. A bracket 14 is secured against the outer face of the wall 11 by means of bolts 15, said bracket having a central sleeve 16, the end of which is mounted in the opening 12, said sleeve 16 being braced by the flanges 17 extending toward the sleeve from the base of the bracket 14. A casing 18 is provided having a boss 19 and a portion 20 which is inclined at an angle to the axis of the casing 18, as clearly shown in Fig. I. The casing 18 is also provided with a peripheral flange 21 which engages the bracket 14 attached to the side 11 of the crank case. The flange 21 is provided with a plurality of slots 22 concentric with the center of the casing 18 and of the bracket 14, and bolts 23 pass through said slots 22 and through openings in the bracket 14 and in the wall 11 of the crank case. The nuts 24 on the bolts 23 are disposed within the bosses 13 formed on the inner side of the wall 11 of the crank case 10.

The steering arm 25 is provided with a spindle at its upper end having an inner and larger portion 26, an outer and smaller portion 27 and an intermediate portion 28, a part of which is tapered and a part of a size intermediate between portions 26 and 27. A sleeve 29 is mounted in the boss 19 around the portion 26 of the steering arm and provided with a radiating flange 30 which engages the inner end of the boss 19. A worm 31 is mounted on the intermediate portion 28 of the spindle, being secured thereto by means of a spline 32. A sleeve 33 is mounted in the sleeve or boss 16 extending from the bracket 14 and provided with a radiating flange 34 which engages the inner end of the sleeve or boss 16. The sleeve 33 is held in place on the spindle 27 by means of a nut 35 and a washer 36 on the end of the spindle.

The spindle of the steering arm is provided with a longitudinally extending passage 37 from which cross passages 38 and 39 radiate to the outside of the portions 26 and 27 of the spindle respectively. The end of the passage 37 opens into the interior of the crank case through the opening 12, so that the lubricating oil from the inside of the crank case finds its way into the passage 37 and is fed from said passage through the passages 38 and 39 to the sleeves 32 and 29 which are lubricated thereby.

The lower end of the portion 20 of the casing is closed by the cap 40 which is held in place thereon by means of the bolts 41 and supports the thrust bearings 42 which abuts the lower end of the worm 43. The thrust bearing 44 is provided at the upper end of the worm 43 and a sleeve 45 is disposed in the casing 20 and holds the thrust bearing in place and said worm accurately meshed. The worm 43 as thus held in place in the portion 20 of the casing meshes with the worm gear 31 which is mounted on the steering arm spindle. The end of the steering column 46 is screwed into the end of the portion 20 of the casing, which is split, the parts being drawn together by a bolt passed through the openings 47 in the matching ears 48. The end of the steering column 46 has an inwardly projecting radiating flange 49 which engages the top of the sleeve 45. The steering post 50 extends down inside the column 46 and has a portion 51 extending through the worm 43 and having a driving engagement therewith. The lower end of the steering post is threaded at 52 and has a nut 53 screwed thereon, abutting the lower end of the worm 43 to hold the worm and post in driving engagement. The nut 52 is inclosed by cap 54 threaded on the end of the cap 40.

In Figs. V, VI and VII, I have shown a slightly modified construction. The bracket 55 is secured to the wall 11 of the crank case 10 by means of bolts 56. The bracket 55 has a laterally projecting pin 57 with an annular groove 58 formed therein. The gear casing 59 has the portion 60, inclined at an angle and receiving the worm, and the hub or boss portion 61, and also has a projecting boss 62 having a semi-cylindrical seat adapted to receive the pin 57. A cap 63 is secured to the boss 62 by means of bolts 64 and has a seat mating with the seat in the boss 62, the two together forming a bearing for the pin 57. A pin 65 is provided in the boss 62 which fits in the groove 58 and a similar pin 66 is provided in the cap 63. A cover 67 for the casing 59 is provided and secured thereto by means of bolts 68. A sleeve 69 projects inwardly from the cover 67 and a boss 70 projects outwardly from said cover 67 in line with the sleeve 69. A steering arm 71 has a spindle comprising a larger and inner portion 72, an intermediate tapered portion 73, and the outer portion 74 of smaller diameter. The inner portion 72 is journaled in a sleeve 75 which is journaled in the boss 61 formed in the casing 59, and provided with a radiating flange 76 abutting the inner end of the boss 61. The worm 77 is mounted on the intermediate portion 73 of the spindle, being secured thereto by means of a spline 78, and the outer end 74 of the spindle is journaled in the sleeve 79, which is mounted in the boss or sleeve 69 formed on the cover 67, and provided with a radiating flange 80 abutting the inner end of the boss 69. The sleeve 79 is held in place by the nut 81 and the washer 82 on the end of the spindle, said nut and washer being housed within the boss 70 on the cover 67.

The lower end of the portion 60 of the casing is closed by the cap 40 which is held in place by means of bolts 41, and this cap 40 supports the thrust bearing 42 which abuts the lower end of the worm 43 which is journaled in the casing 60 meshing with the worm gear 77 on the steering arm spindle. A thrust bearing 44 abuts the upper end of the worm 43 and is held in place by a sleeve 45 which is mounted in the upper end of the portion 60 of the casing. The end of the steering column 46 is screwed into the upper end of the portion 60 of the casing, and clamped in place therein by means of a bolt passing through the openings 47 in the ears 48 on the upper end of the portion 60 of the casing, which is split so as to adapt itself to this clamping action. The lower end of the steering column has a radiating flange 49 which abuts the upper end of the sleeve 45 and thus forces it into position against the upper end of the thrust bearing 44. The steering post 50 is disposed within the column 46 and extends through the worm 43, the portion 51 of the steering post having a driving engagement with the worm. The lower end of the portion 51 is threaded at 52 and a nut 53 is screwed thereon which retains the worm in place and in driving engagement with the portion 51 of the steering post. The lower end of the casing is closed by a cap 54 which is threaded on the end of the cup or cap 40. This construction is the same as in the preferred form of my device illustrated in Figs. I to IV, inclusive.

From the description given above, the operation of this device should be very readily understood. In Figs. I to IV, inclusive, it will be seen that the steering arm spindle is journaled in the casing 18 and the worm gear 31 is splined on the spindle within the casing 18. The worm 43 is also journaled in the portion 20 of the casing 18 and meshes with the worm gear. This casing, therefore, forms a compact, unitary housing for the worm gear mounted on the spindle and the worm connecting it with the steering post. Both these parts may be assembled together before being applied to the motor vehicle. The casing 18 is rotatably mounted upon the bracket 14 which is detachably secured to the side of the engine crank case, and the position of the casing with reference to this bracket may be determined by means of the bolts 23 passing through the concentric slots 22. The tightening of these bolts prevents rotation of the casing relative to the bracket 14 on which it is mounted. In operation the worm gear, the steering arm, the steering arm spindle and the worm are mounted within the casing 18 in the proper position. The casing 18 is then mounted on the bracket 14 which has been attached to the side of the engine crank case, the bolts 23 being left loose so that the casing is free to rotate to a certain extent relative to the bracket 14. The column 46 is then inserted in place in the motor vehicle and its lower end is screwed into the upper end of the portion 20 of the casing 18 and clamped therein by means of the bolt passing through the openings 47. The fact that the casing 18 is loosely mounted on the bracket 14 so as to rotate thereon, permits of the rotation of the casing so as to get the proper inclination of the portion 17 to correspond to the inclination which is given the steering column 46 when it is inserted in the motor vehicle. When the steering column has been inserted in place at the proper angle, the position of the casing 18 relative to the bracket being then determined, the bolts 23 are tightened up by screwing up the nuts 24 and the casing 18 is thereby held against movement or rotation relative to the crank case. The steering post is then inserted in the steering column, the portion 51 of the steering post passing through the worm 43 and having a driving engagement therein, and the nut 53 is threaded on the end 52 of the steering post and inclosed within the cap 54 threaded onto the end of the cup 40.

It will be seen that the sleeve 16 is in line with the opening 12 in the side of the crank case 11 and the end of the steering arm spindle 27 extends in line with this opening, so that the passage 37 in the steering arm spindle is open to the crank case. The revolution of the crank shaft within the crank case creates a splash or mist of lubricating oil which may pass through the passage 37 and the ports 38 and 39 to the sleeves 29 and 33 which are lubricated thereby.

By referring to Figs. V, VI and VII of the drawing, it will be seen that the form of my device, which I have illustrated in these views, is in many respects similar to the preferred form shown in the preceding views. In this form the steering arm and the steering arm spindle are journaled in a casing, the worm gear 77 is mounted on the spindle within the casing and meshes with the worm 43 which is also journaled within the portion 60 of said casing. The entire casing is rotatably mounted on a pivot pin 57 which is fixed to the side of the engine crank case, the lateral movement of said casing relative to said pivot pin being prevented by engagement of the pins 65 and 66 in the groove 58 of the pin 57. In this form of my device also, the steering arm and the steering arm spindle, the worm gear and the worm are assembled in the casing and the casing is then mounted on the pivot pin 57 and the cap 63 is attached to the boss 62, thus retaining the casing in place but permitting its rotation. The steering column 46 is then inserted in the portion 60 of the casing, as in the preferred form of my device, and the steering post is also inserted and locked in position so as to drive the worm. The devices used to secure the steering post and the steering column in their fixed angular position with reference to the motor vehicle serve to fix the position of the casing 59 so that no additional securing means are necessary to prevent the rotation of said casing relative to its fixed support.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. In a device of the class described, the combination of a casing rotatably mounted upon a fixed support, means for holding said casing against rotation relative to said support, a steering arm having a spindle journaled within said casing substantially concentric with the axis of rotation of the casing, a steering post and means for operating the steering arm from the steering post.

2. In a device of the class described, the combination of a casing, a steering arm having a spindle journaled in said casing, a fixed support, means for rotatably supporting the casing upon the support in such a manner as to enable the casing to be rotated slightly about the spindle as a center, and a steering post having a driving connection with said spindle within said casing.

3. A device of the class described comprising the combination of a casing rotatably mounted on a fixed support; means for holding said casing against rotation relative to said support; a steering arm having a spindle journaled within said casing substantially concentric with the axis of rotation of the casing; a worm gear fixed on said spindle within said casing; a worm journaled in said casing and meshing with said worm gear; a steering column having its lower end threaded into a portion of said casing; and a steering post housed within said column and having a driving engagement with said worm within said casing.

4. A device of the class described, comprising the combination with an engine crank case of a casing rotatably mounted on said engine crank case; a steering arm provided with a spindle journaled in said casing; a worm gear mounted on said spindle within said casing; a worm journaled in said casing and meshing with said worm gear; a steering column having its lower end connected with said casing; and a steering post housed within said column, and having a driving connection with said worm within said casing.

5. A device of the class described, comprising the combination of an engine crank case; a bracket fixed to the side of said crank case; a casing rotatably mounted on said bracket; means for fixing said casing against rotation relative to said bracket; a steering arm provided with a spindle journaled in said casing; a worm gear fixed on said spindle within said casing; a worm journaled in said casing and meshing with said worm gear; a steering column having its lower end connected with said casing; and a steering post housed within said column and having a driving connection within said worm within said casing.

6. A device of the class described, comprising the combination of an engine crank case provided with an opening in the side thereof; a bracket secured to the side of said engine crank case and provided with an outwardly projecting sleeve in line with said opening; a casing rotatably mounted on said bracket; means for fixing said casing against rotation relative to said bracket; a steering arm provided with a spindle journaled in said casing, the outer end of said spindle being journaled in said bracket sleeve; a worm gear fixed on said spindle within said casing; a worm journaled in said casing and meshing with said gear; a steering column having its lower end fixed to said casing; and a steering post housed within said column and having a driving connection with said worm within said casing.

7. A device of the class described, comprising the combination of an engine crank case provided with an opening in the side thereof; a bracket secured to the side of said engine crank case, and having an outwardly projecting sleeve in line with said opening; a casing rotatably mounted upon said bracket and provided with a flange having a plurality of concentric slots therein, bolts extending through said slots and said bracket; a steering arm provided with a spindle journaled in said casing, the outer end of said spindle being journaled in said bracket sleeve; a worm gear fixed on said spindle within said casing; a worm journaled in said casing and meshing with said gear; a steering column having its lower end connected to said casing; and a steering post housed within said column and having a driving engagement with said worm within said casing.

8. A device of the class described, comprising the combination of an engine crank case, provided with an opening in the side thereof; a bracket secured to the side of said engine crank case and provided with an outwardly extending sleeve in line with said opening; a casing rotatably mounted on said bracket; means for preventing the rotation of said casing relative to said bracket; a steering arm provided with a spindle journaled in said casing, the outer end of said spindle being journaled in said sleeve and said spindle being provided with a longitudinally extending opening at the outer end of said spindle and a plurality of transverse ports extending from the outer surface of said spindle to said longitudinally extending passage; a worm gear fixed on said spindle within said casing; a worm journaled within said casing and meshing with said gear; a steering column having its lower end fixed to said casing; and a steering post housed within said column and having a driving connection with said worm within said casing.

9. A device of the class described, comprising the combination with an engine crank case of a casing rotatably mounted thereon; means for preventing the rotation of said casing relative to said crank case; a steering arm provided with a spindle journaled in said casing; a worm gear fixed on said spindle within said casing, said casing being provided with a portion extending at an angle with reference to the axis of said casing; a cup closing the lower end of said portion; a worm mounted within said portion and meshing with said gear, the lower end of said worm being journaled in said cup; a steering column having its lower end connected to the upper end of said portion of the casing; a steering post housed within said column and having a driving connection with said worm within said portion of the casing; and a cap detachably connected to said cup and inclosing the lower end of said steering post.

10. A device of the class described, comprising the combination of a fixed support; a casing rotatably mounted thereon; a steering arm provided with a spindle, the outer and inner ends of said spindle being journaled in said casing; a worm gear fixed on said spindle within the casing, the axis of the worm gear being substantially concentric with the axis of rotation of the casing; a worm meshing with said worm gear within the casing; a steering column connected to the upper end of said casing; and a steering post housed within said column and having a driving connection with said worm within said casing.

11. A device of the class described, comprising the combination of a fixed support; a casing rotatably mounted thereon, the opposite walls of said casing being provided with laterally extending sleeves; a steering arm provided with a spindle journaled in said sleeves; a worm gear mounted on said spindle within said casing and between said sleeves; a worm journaled in said casing and meshing with said gear; a steering column having its lower end connected to said casing; and a steering post housed within said column and having a driving connection with said worm within said casing.

12. A steering mechanism for motor vehicles, comprising the combination with a fixed support of a casing rotatably mounted on said fixed support; a steering arm provided with a spindle journaled in said casing, the axis of the spindle being substantially concentric with the axis of rotation of the casing; reducing gearing housed within said casing and having a connection with said steering arm spindle; and a steering post extending into said casing and having a driving connection with said reducing gearing.

13. A device of the class described comprising the combination of a casing rotatably mounted on a fixed support, means for holding said casing against rotation relative to said support, a steering arm having a spindle journaled within said casing substantially concentric with the axis of rotation of the casing, a worm gear fixed on said spindle within said casing, a worm journaled in said casing and meshing with said worm gear, and a steering post having a driving engagement with said worm within said casing.

14. A device of the class described comprising the combination of a casing rotatably mounted on a fixed support, means for holding said casing against rotation relative to said support, a steering arm having a spindle journaled within said casing substantially concentric with the axis of rotation of the casing, and a steering post having a driving engagement with said spindle within said casing.

15. A device of the class described comprising the combination of an engine crank case provided with an opening in the side thereof, a bracket secured to the side of said engine crank case and provided with an outwardly projecting sleeve in line with said opening, a casing rotatably mounted on said bracket, means for fixing said casing against rotation relative to said bracket, a steering arm provided with a spindle journaled in said casing, the outer end of said spindle being journaled in said bracket sleeve, and a steering post having a driving connection with said spindle within said casing.

16. A device of the class described, comprising the combination of an engine crank case, provided with an opening in the side thereof, a bracket secured to the side of said engine crank case and having an outwardly projecting sleeve in line with said opening, a casing rotatably mounted upon said bracket and provided with a flange having a plurality of concentric slots therein, bolts extending through said slots and said bracket, a steering arm provided with a spindle journaled in said casing one end of said spindle being journaled in said bracket sleeve, and a steering post having a driving connection with said spindle within said casing.

In testimony whereof I affix my signature.

EDWARD H. BELDEN.